(12) United States Patent
Krouse

(10) Patent No.: US 6,543,767 B1
(45) Date of Patent: Apr. 8, 2003

(54) DEVICE AND METHOD FOR CHANGING A SPEED OF SHEET PRODUCTS

(75) Inventor: Charles Lambert Krouse, Madbury, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 193 days.

(21) Appl. No.: 09/699,893

(22) Filed: Oct. 30, 2000

(51) Int. Cl.$^7$ ............... B65H 5/34; B65H 5/02; B65H 5/04; B65G 47/28; B65G 23/00
(52) U.S. Cl. ............ 271/270; 271/275; 198/459.8; 198/460.2; 198/792
(58) Field of Search ................ 271/270, 271, 271/275, 277; 198/459.8, 460.2, 460.3, 792

(56) References Cited

U.S. PATENT DOCUMENTS

| | | | |
|---|---|---|---|
| 4,201,286 A | * 5/1980 | Meier | 271/277 |
| 4,320,894 A | * 3/1982 | Reist et al. | 271/277 |
| 5,261,656 A | * 11/1993 | Gutov et al. | 271/187 |
| 5,409,208 A | * 4/1995 | Schmid | 271/277 |
| 5,452,886 A | 9/1995 | Cote et al. | 271/270 |
| 5,560,599 A | 10/1996 | Curley et al. | 271/270 |
| 5,669,604 A | * 9/1997 | Hansen | 271/270 |
| 5,794,929 A | 8/1998 | Curley et al. | 271/270 |
| 5,975,280 A | 11/1999 | Cote et al. | 198/474.1 |
| 6,142,468 A | * 11/2000 | Gunschera et al. | 271/277 |
| 6,176,484 B1 | * 1/2001 | Greive et al. | 271/277 |

* cited by examiner

Primary Examiner—Christopher P. Ellis
Assistant Examiner—Gene O. Crawford
(74) Attorney, Agent, or Firm—Davidson, Davidson & Kappel, LLC

(57) ABSTRACT

A sheet product transfer device includes an elastic belt forming a continuous loop, the elastic belt having an inner surface, a first drive unit contacting the inner surface, a second drive unit spaced apart from the first drive unit and contacting the inner surface of the elastic belt, the second drive unit driving the elastic belt at a different surface speed than the first drive unit, and a plurality of sheet product grippers arranged on the elastic belt. Also disclosed is a method for transferring sheet products comprising gripping a sheet product with a gripper attached to a continuous elastic belt, decelerating the sheet product, and releasing the sheet product.

13 Claims, 5 Drawing Sheets

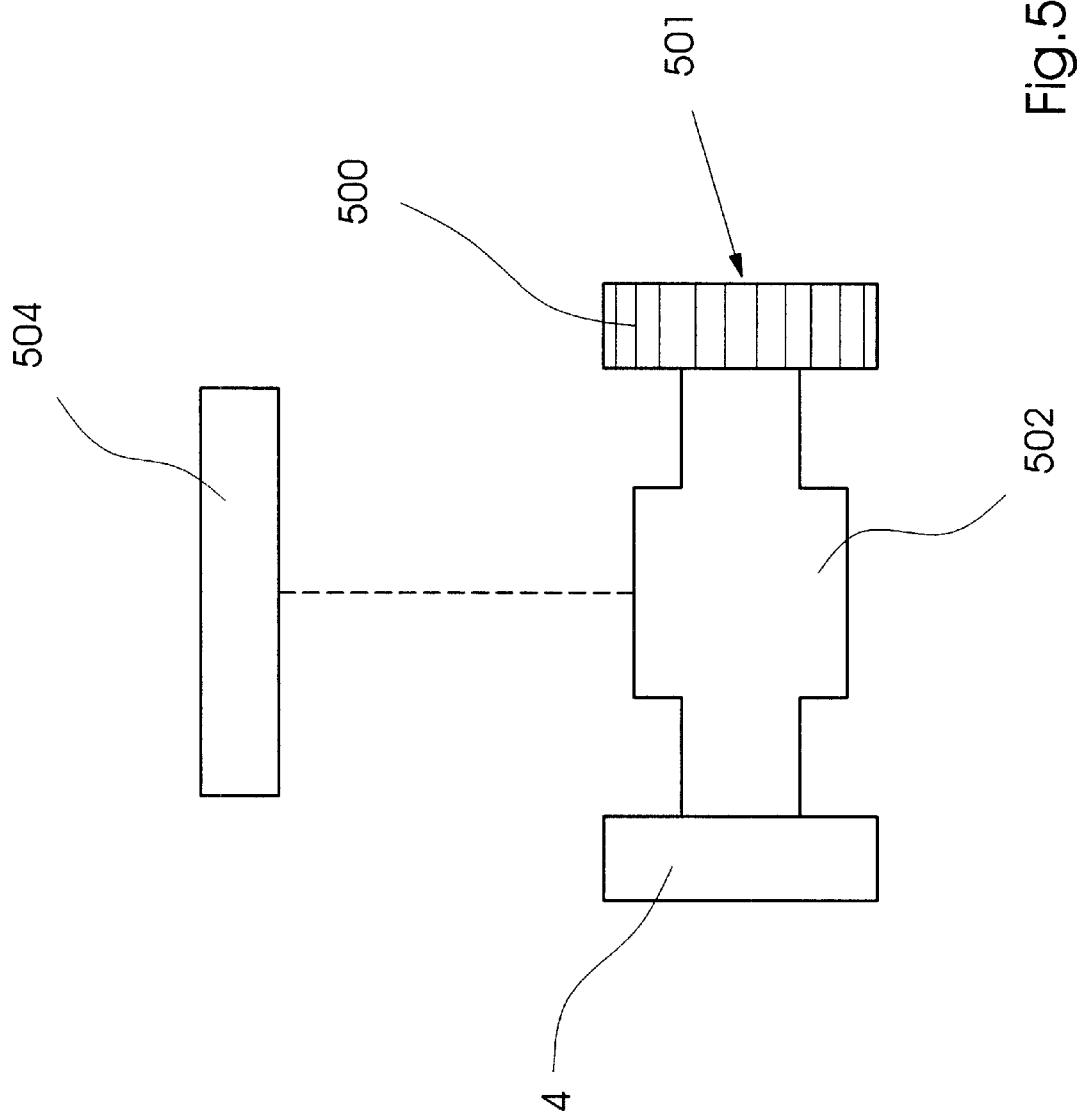

DEVICE AND METHOD FOR CHANGING A SPEED OF SHEET PRODUCTS

BACKGROUND OF THE INVENTION

1. Field of the Invention

The present invention relates generally to printing presses and more particularly to a device and method for decelerating or accelerating printed products.

2. Background Information

Web printing presses print a continuous web of material, such as paper. In a folder of the printing press, the continuous web then is cut into signatures in a cutting unit and folded.

One way to slow the velocity of the signature is with a fan wheel. Fan wheels comprise a plurality of fan wheel discs defined by a plurality of outwardly projecting curve-shaped fan blades. Fan wheel pockets formed by adjacent pockets receive signatures exiting the folding device. The curved shape and jagged surface of the fan wheels slow the forward movement of the signatures being deposited in the fan pockets. As the fan rotates, the signature is deposited on a delivery system such as a conveyor belt.

A drawback of this device is that because the signatures enter the fan wheel pockets at such high velocity, they forcefully impact against the blades of the fan wheel causing the signatures to tear or otherwise become damaged. Another drawback of these devices is that the signatures cannot be precisely aimed towards the bottom of the fan wheel pockets. The reason the signatures can not be precisely aimed is that as the signatures come off belts leading to the fan wheel, a number of factors come into play, such as the paper caliper, the number of pages in the signature, the nature of the paper, and even the amount of ink thereon, which will all affect the motion of the signature so that, dependent on the cumulative effect of such factors, the signature may land neatly on the bottom of the fan wheel pocket or may recoil backwards or catch on the edge of a fan wheel blade. Once a signature is irregularly positioned on the fan wheel, the signature will be deposited onto the delivery belt irregularly as well and the product stream thereon is likely to contain laterally displaced, unevenly spaced, or skewed signatures, especially where large speed reductions are required.

One way to slow down signatures is a deceleration drum. The deceleration drum comprises a number of rows of grippers rotating between a transfer supply device and a delivery system. The gripper seizes the leading edge of a signature exiting a transporting device in a folding machine. The gripper is attached to a drum, which decreases the velocity of a signature.

However, a drawback of the deceleration drum is the transfer of the signature from the supply device necessitates positioning the deceleration drum so that the gripper rotates in front of the leading edge of the signature being delivered by the supply device; thus, the velocity of the signature being controlled by the supply device should be greater than the tangential velocity of the gripper on the deceleration drum. When the signature has entered the throat of the gripper, the gripper closes and the velocity of the leading edge of the product abruptly changes to match the velocity of the gripper. The abrupt change can result in distortion or tearing of the signature. A further drawback of the device is that the device requires many complicated parts that are subject to mechanical wear and fatigue.

U.S. Pat. No. 5,975,280 purports to disclose a device for transporting flat products to further processing units. The '280 patent provides for a track forming a continuous loop, a plurality of gripper elements, and a driving module. The gripper elements are arranged on the track and include a gripper for seizing a flat product from a first device and releasing the flat product to a second device. Each gripper element moves independently from each other gripper element along at least a portion of the track. Each gripper element is selectively engaged by the driving module for movement along the track.

The '280 patent has the disadvantage that a complex arrangement of multiple mechanical parts is necessary to actualize the transfer of the flat products. The complex arrangement leaves the device subject to mechanical wear and fatigue.

Moreover, the complexity of the device complicates repair and servicing.

U.S. Pat. No. 5,794,929 purports to disclose a variable velocity profile deceleration device. The '929 patent provides for gripping at high speeds a signature from a cutting cylinder, tape system, or other transporting device. The signatures are positively gripped, decelerated through a smooth velocity profile, and delivered to a further processing device such as a single copy gripper conveyor or a stacker. The deceleration device includes a plurality of rotary grippers mounted to a drum, which rotate about an axis under the control of a drive. A control unit monitors the angular position of the rotary grippers and the rotational speed of the rotating drum and individually controls each gripper, causing the gripper to seize a signature exiting the transporting device.

The '929 patent has the disadvantage that a complex arrangement of multiple mechanical parts is necessary to actualize the transfer of the flat products. The complex arrangement leaves the device subject to mechanical wear and fatigue. Moreover, the complexity of the device complicates repair and servicing.

U.S. Pat. No. 5,452,886 purports to disclose a device for slowing down signatures being transported in a folding machine. The device provides for a plurality of rotary grippers which positively grip signatures exiting a tape conveyor system. A deceleration drum is also provided for slowing down the drums through a smooth velocity profile. The deceleration drum has a plurality of pivot arms pivotally mounted on a pivot disc rotating about a first axis, the pivot arms being connected to a control disc by a control link.

The '886 patent has the disadvantage that a complex arrangement of multiple mechanical parts, e.g., the pivot disc, is necessary to actualize the transfer of the flat products. The complexity leaves the device subject to mechanical wear and fatigue. Moreover, the complexity of the device complicates repair and servicing.

U.S. Pat. No. 5,560,599 purports to disclose a device for slowing down signatures being transported in a folding machine. The device provides for a plurality of rotary grippers, defined by a set of oppositely rotating upper and lower rollers, which receive the leading edge of the signature exiting a transporting device. A deceleration drum is also provided for slowing down the drums through a smooth velocity profile. The deceleration drum has a plurality of pivot arms pivotally mounted on a pivot disc rotating about a first axis, the pivot arms being connected to a control disc by a control link.

The '559 patent has the disadvantage that a complex arrangement of multiple mechanical parts, e.g., the upper and lower rollers and the pivot disc, is necessary to transfer the flat products. The complexity leaves the device subject to mechanical wear and fatigue. Moreover, the complexity of the device complicates repair and servicing.

BRIEF SUMMARY OF THE INVENTION

An object of the present invention is to provide for a device and method for continuously handling a signature as it exits a folding device in a printing press and is transported to a delivery system for further processing. An additional or alternative object of the present invention is to provide a device for decelerating consecutive signatures. Yet another additional or alternative object of the present invention is to provide a device for delivering consecutive signatures from a folding device to a delivery system in an orderly fashion with minimal distortion by using a simple elastic belt mechanism.

The present invention provides a device for transporting flat products to further processing units comprising:
 a first drive unit;
 a second drive unit;
 an elastic belt forming a continuous loop, contacting both the first drive unit and second drive unit and moving around the first and second drive units; and
 a plurality of grippers arranged on the elastic belt for seizing a flat product from a first device and releasing the flat product to a second device.

With the elastic belt of the present invention, positive signature deceleration is possible with a simpler mechanism, at a lower cost, and with higher reliability.

Preferably, the first and second drive units further comprise a plurality of notches disposed along the rim of pulleys of the first and second drive units and the elastic belt may comprise a plurality of timing lobes disposed on the inner surface of the belt, the timing lobes shaped so as to fit in the notches. The advantage thus provided is the notches work with the timing lobes to provide synchronous rotation between the first and second drive units. Also, accumulative drift of the elastic belt is prevented.

The first and second drive units preferably include pulleys or rolls over which the elastic belt travels.

Preferably, the first drive unit further includes a pulley with a radius different from a pulley of the second drive unit. Advantageously, the different radii produce surface speed differences that alter the speed of the elastic belt and thus the flat product, which is held in the gripper that is attached to the elastic belt. For example, a signature can be picked up at the large radius drive unit at a high speed and dropped off at the small radius drive unit at low speed. The change in radii affects the surface speed of the drive units, which in turn affects the speed of the elastic belt. The speed change of the elastic belt occurs at two speed transition regions, located around the points where the elastic belt contacts the drive units. The folded product transfers may occur at any point, however, it is preferably that the folded products are not transferred in the speed transition regions. The elastic belt stretches and contracts in response to the speed changes.

The first drive unit may further comprise a pulley having a radius the same as a pulley of the second drive unit and the first drive unit may run at a rotational velocity different from the second drive unit. Advantageously, the different rotational velocities produce surface speed differences that alter the speed of the grippers holding the printed or sheet product, which is held in the gripper that is attached to the belt. For example, a signature can be picked up at the fast rotational velocity drive unit at a high speed and dropped off at the slow rotational velocity drive unit at a slow speed. The change in rotational velocity affects the speed of the signature because the slow rotational velocity drive unit operates at a slower surface speed than the fast rotational velocity drive unit, which in turn affects the speed of the elastic belt.

Preferably, the present invention may further comprise at least one power transmission device for driving and synchronizing the first and second drive units. Power transmission devices for each drive unit may be provided, or a single power transmission device with gearing for both drive units may be provided.

Preferably, each of the power transmission devices has an individual motors. Advantageously, repair of a failed element is simple; the motor can be replaced instead of a part of a complex mechanical mechanism. Also, the first and second drive units can be synchronized by setting the speeds of the motors.

The transport device may further comprise a plurality of translatable idler drive units positioned so at to contact the elastic belt and a register mechanism for synchronizing the two power transmission devices, so that phasing between the drive units and the folded material transfer times can occur.

Each of the plurality of translatable idler drive units may further include a plurality of notches disposed along the rim of each translatable idler drive unit.

Preferably, each of the plurality of translatable idler drive units may further include pulleys or rolls. The improved versatility allows the invention to be used in a variety of different configurations in printing presses.

Each of the plurality of translatable idler drive units may have different radii. The differing radii allow the translatable idler drive units to remain in synchronization with the elastic belt.

Preferably, the present invention may further comprise a control system for actuating translation of each of the translatable idler drive units and the register mechanisms. Advantageously, phasing is improved between the drive units and the folded material transfer times.

The present invention also provides a method for changing the speed of a signature including the steps of:
 gripping a flat product from a first device with a gripper device attached to a continuous elastic belt;
 rotating the continuous elastic belt by a first drive unit and a second drive unit, so as to move the flat product; and
 releasing the flat product.

Although the pitch of the belt lobes are uniform if the elastic belt is unstretched, when the elastic belt is in operation, the elastic belt is non-uniformly stretched and non-uniform pitch of the lobes results. Hence, the pitch of the lobes on the first drive unit differs from the pitch on the second drive unit.

The present invention also may provide an elastic belt on pulleys without timing notches. A steady state extension of the belt will occur even though there is a large speed difference between the pulleys. As the belt is driven by one of the drive units, the belt attains the velocity of the drive unit. In so doing, the segment of the belt attaining the velocity of the drive unit will have the same unstretched length when it attains the velocity of the other drive unit. Thus, at the higher velocity the elastic belt has a higher strain and at a lower velocity the elastic belt has a lower strain. The belt velocity transition occurs as the belt leaves the first or second drive units and enters a free span of the belt between the drive units. The timing elements ensure the belt remains synchronized with the first and second drive units so there is no accumulative drift and the first and second drive units are synchronized by the power transfer devices.

BRIEF DESCRIPTION OF THE DRAWINGS

A preferred embodiment of the present invention is described below by reference to the following drawings, in which:

FIG. 5 shows a top view of the power transmission device, which includes the drive unit.

DETAILED DESCRIPTION

Figure 1:
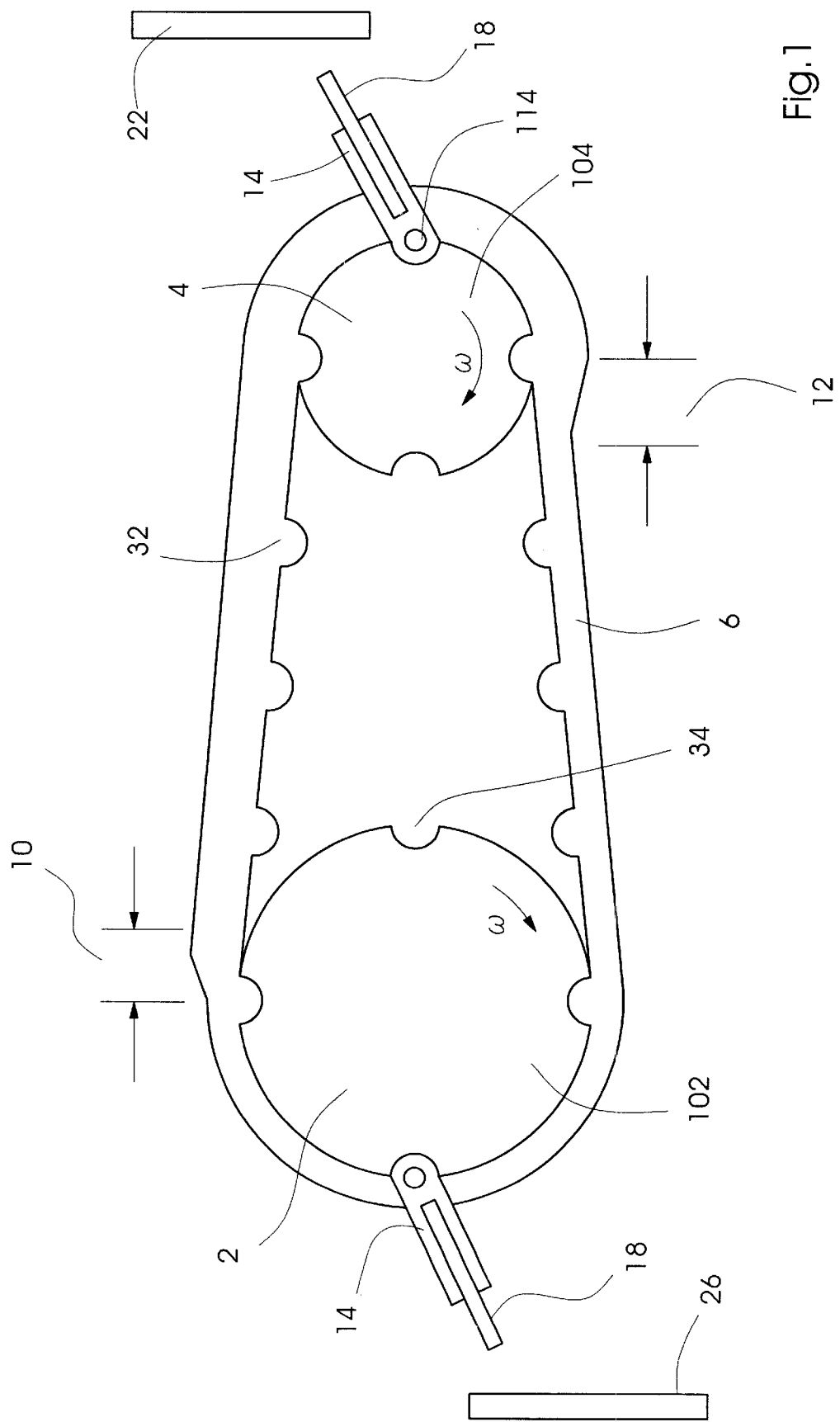
FIG. 1 shows a side view of a first embodiment of the device for transporting flat products, which includes a first drive unit and a second drive unit with pulleys of different radii.

FIG. 1 shows a side view of a first embodiment of the device for transporting flat products, which includes a first drive unit 2 and a second drive unit 4. The first drive unit has a pulley 102 having a larger radius than a pulley 104 of drive unit 4.

The first drive unit 2 and second drive unit 4 drive a continuous elastic belt 6 in a circular direction by imparting the rotation of the drive units 2, 4 to the elastic belt 6 at the location where the drive units 2, 4 contact the inner surface of the elastic belt 6. The first and second drive units 2, 4 may be geared one-to-one so that the first and second drive units 2, 4 have the same rotational velocity. However, a larger radius, e.g., one-half greater, of the first drive unit 2 causes a surface speed difference in the first drive unit 2. The speed difference causes the elastic belt 6 to deform and change velocity. The first drive unit 2 is driven by a power transmission device, as shown in FIG. 5, which acts to provide power to and synchronize the first drive unit 2. The second drive unit 4 is driven by gearing connected to the power transmission device for drive unit 2, or by another power transmission device, as shown in FIG. 5, which acts to provide independent power to and synchronize the second drive unit 4.

On leaving the first drive unit 2, the elastic belt 6 enters a low speed transition region 10, where the elastic belt 6 contracts and decreases in speed. On leaving the second drive unit 4, the elastic belt 6 enters a high speed transition region 12, where the elastic belt 6 elongates and increases in speed. Each of a plurality of grippers 14 attached to the elastic belt 6 may seize a flat product 18 from a first device 26 and release the flat product 18 to a second device 22. The products 18 are thus decelerated from the speed of the roller 2 to the speed of roller 4. The product transfers may occur at any point along the elastic belt 6; however, it is preferable if the transfers do not occur in the high speed transition region 12 or low speed transition region 10.

The transfer of the flat products, preferably printed sheets or signatures, can be effected by cams which open and close grippers 14. Devices 22 and 26 may be, for example, conveyor belts. Although only two grippers 14 are shown, it should be understood that more than two grippers 14 can be spaced along belt 6, preferably at even intervals. The belt 6 may be made of rubber and the grippers 14 fixed to the belt via steel rods embedded in the rubber of the elastic belt.

Each of a plurality of notches 34 disposed along the rim of the first drive unit and second drive unit 4 mesh with a plurality of timing lobes 32 disposed on the inner surface of the elastic belt 6, each of the timing lobes 32 shaped so as to fit in each of the notches 34, thereby synchronizing the first drive unit 2 with the second drive unit 4. The notches 34 of the first drive unit 2 differ in spacing from the notches 34 of the second drive unit 4 because the elastic belt 6 is non-uniformly stretched in operation, which results in non-uniform stretch of the belt segments between each of the timing lobes 32.

The first drive unit 2 and second drive unit 4 can be, but are not limited to, pulleys or rolls.

Figure 2:
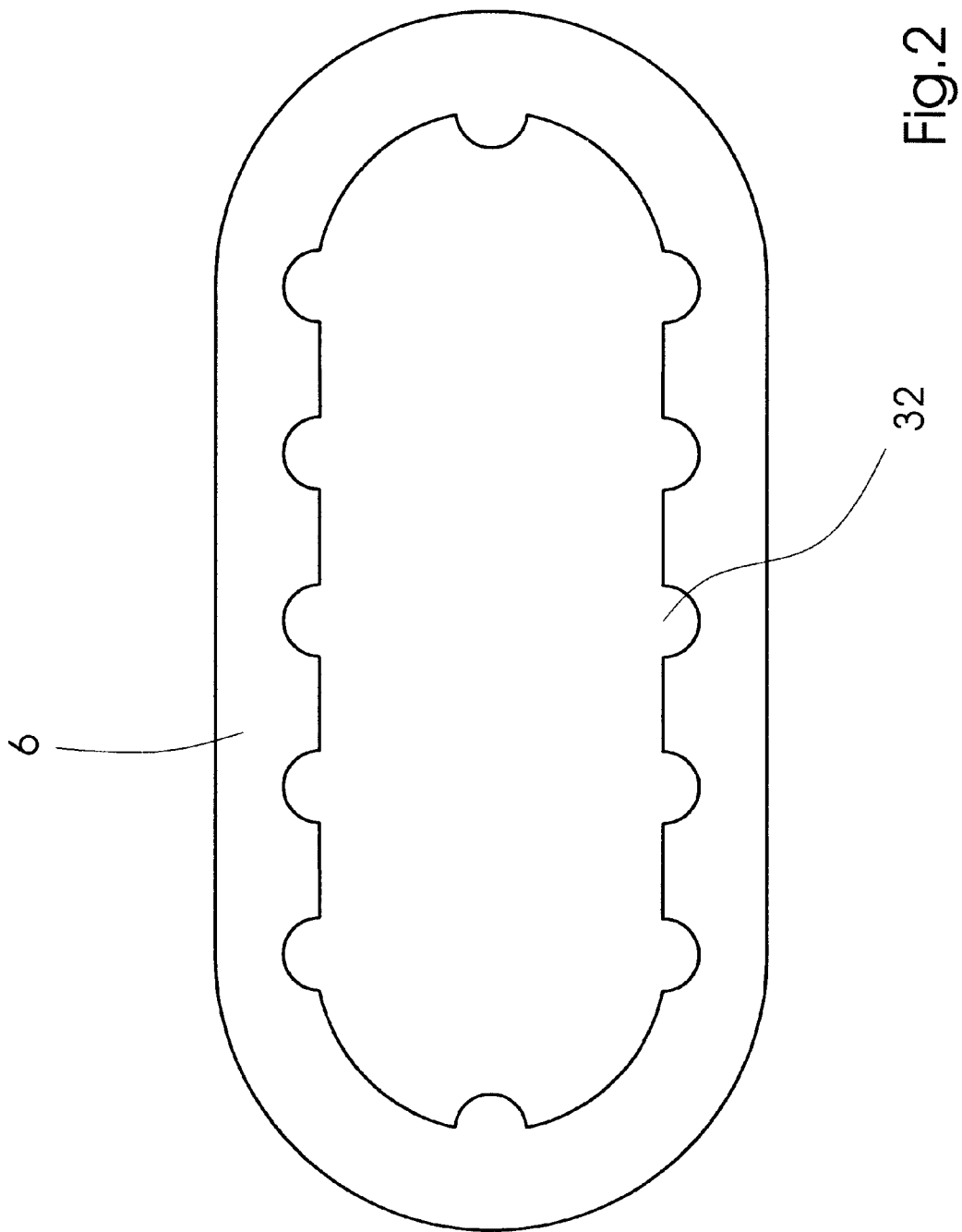
FIG. 2 shows a side view of the elastic belt, which is in an unstretched state.

FIG. 2 shows a side view of the elastic belt 6, which is in an unstretched state. The pitch of the timing lobes 32 are uniform; however, in operation the belt is non-uniformly stretched and results in non-uniform pitch of the timing lobes 32.

Figure 3:
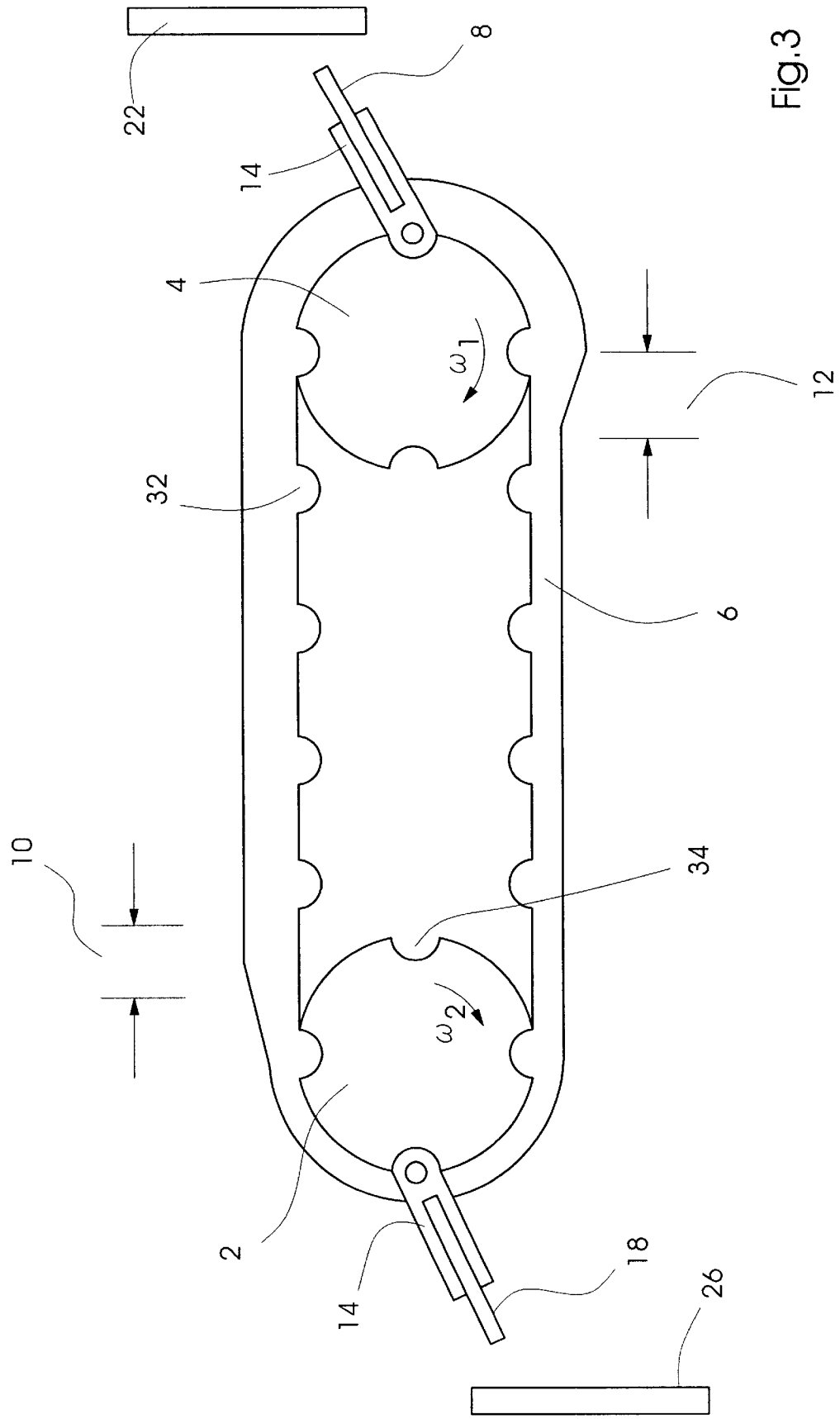
FIG. 3 shows a side view of a second embodiment of the device for transporting flat products, which includes the first drive unit and second drive unit, with pulleys of the same radius.

FIG. 3 shows a side view of a second embodiment of the device for transporting flat products, which includes the first and second drive units 2, 4, with pulleys having the same radius.

The first drive unit 2 and second drive unit 4 drive the continuous elastic belt 6 in a circular direction by imparting the rotation of the drive units 2, 4 to the elastic belt 6 at the arcs where the drive units 2, 4 contact the inner surface of the elastic belt 6. The first drive unit 2 and the second drive unit 4 have the same radius, but different rotational velocities. The different rotational velocities translate to different surface speeds, which in turn cause a speed difference in the elastic belt 6. The first drive unit 2 and second drive unit 4 may be geared to produce different rotational velocities, e.g., three-to-one. The speed difference causes the elastic belt 6 to deform and change velocity.

The first drive unit 2 is driven by one of the plurality of power transmission devices, as shown in FIG. 5, which acts to provide power to the first drive unit 2. The second drive unit 4 may also driven by one of the power transmission devices, or through gearing to the power transmission device for drive unit 2.

On leaving the first drive unit 2, the elastic belt 6 enters the low speed transition region 10, where the elastic belt 6 contracts and decreases in speed. On leaving the second drive unit 4, the elastic belt 6 enters the high speed transition region 12, where the elastic belt 6 elongates and increases in speed. Each of the plurality of grippers 14 attached to the elastic belt 6 may seize the flat product 18 from the first device 22 and release the flat product 18 to the second device 26. The transfers may occur at any point along the elastic belt 6; however, it is preferable if the transfers do not occur in the high speed transition region 12 or low speed transition region 10.

Each of the plurality of notches 34 disposed along the rim of the first drive unit 2 and second drive unit 4 mesh with the plurality of timing lobes 32 disposed on the inner surface of the elastic belt 6, each of the timing lobes 32 shaped so as to fit in each of the notches 34, thereby synchronizing the first drive unit 2 with the second drive unit 4. The notches 34 of the first drive unit 2 differ in spacing from the notches 34 of the second drive unit 4 because the elastic belt 6 is non-uniformly stretched in operation, which results in non-uniform stretch of the belt between each of the timing lobes 32.

The first drive unit 2 and second drive unit 4 can include, but are not limited to, pulleys or rolls.

Figure 4:
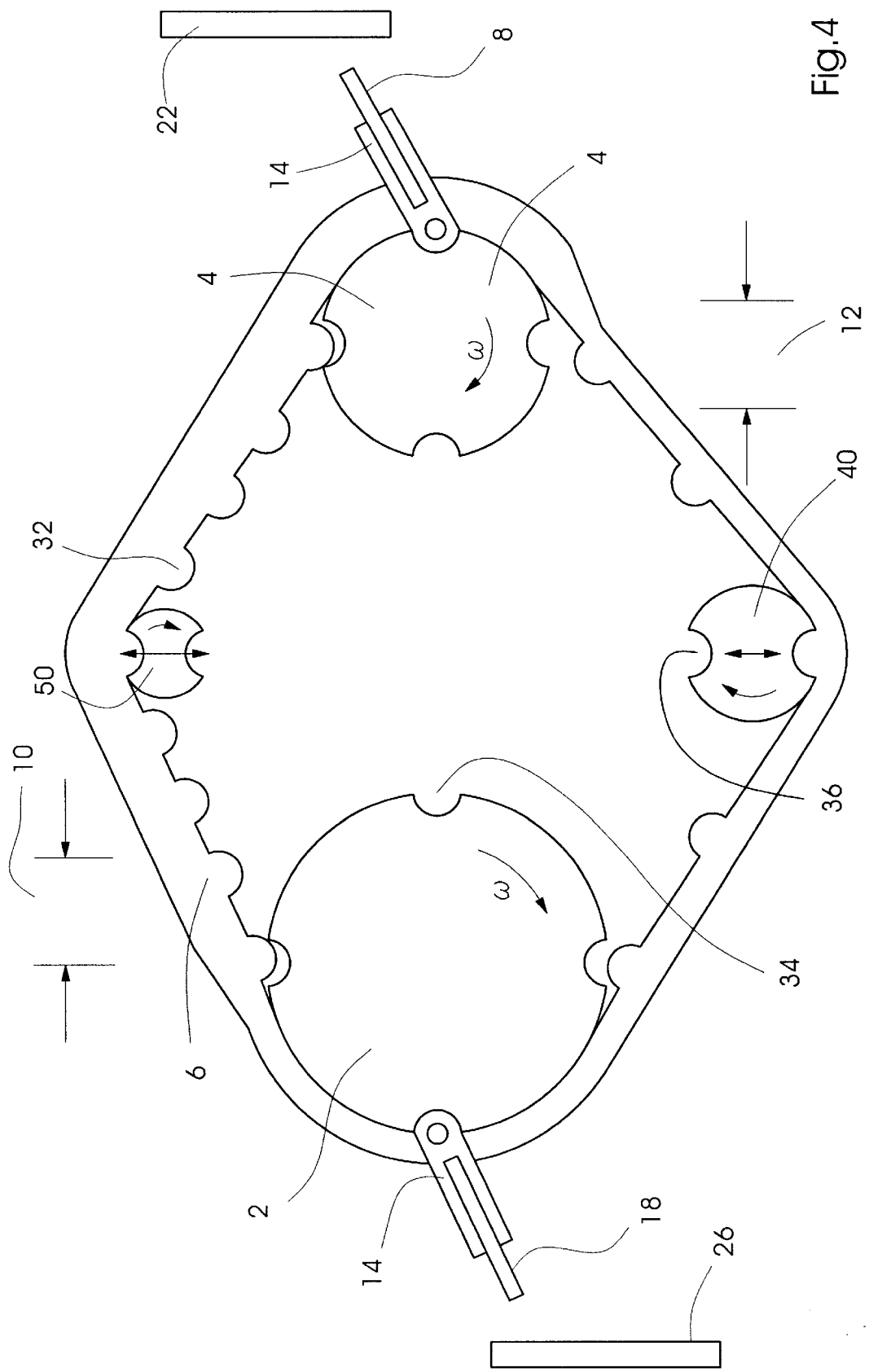
FIG. 4 shows a side view of a third embodiment of the device for transporting flat products, which includes a register mechanism.

FIG. 4 shows a side view of a third embodiment of the device for transporting flat products.

The first drive unit 2 and second drive unit 4 drive the continuous elastic belt 6 in a circular direction by imparting the rotation of the drive units 2, 4 to the elastic belt 6 at the arcs where the drive units 2, 4 contact the inner surface of the elastic belt 6. The first and second drive units 2, 4 are geared one-to-one, however, a larger radius, e.g., one-half greater, of the first drive unit 2 causes a surface speed difference in the drive unit 2. The speed difference causes the elastic belt 6 to deform and change velocity.

The first and second drive units 2, 4 are driven by at least one of the power transmission devices, as shown in FIG. 5, which acts to provide power to and synchronize the first drive unit 2 and second drive unit 4.

On leaving the first drive unit 2, the elastic belt 6 enters the low speed transition region 10, where the elastic belt 6 contracts and decreases in speed. On leaving the second drive unit 4, the elastic belt 6 enters the high speed transition region 12, where the elastic belt 6 elongates and increases in speed. Each of the grippers 14 attached to the elastic belt 6 releases the flat product 18 to the first device 22 and seizes the flat product 18 from the second device 26. The transfers may occur at any point along the elastic belt 6; however, it is preferable if the transfers do not occur in the high speed transition region 12 or low speed transition region 10.

Each of the plurality of notches 34 disposed along the rim of the first drive unit 2 and second drive unit 4 mesh with the timing lobes 32 disposed on the inner surface of the elastic belt 6. Each of the timing lobes 32 is shaped so at to fit in each of the notches 34 in order to ensure synchronization.

In order to alter a phase between the drive units 2, 4 and the signature transfer times, a plurality of translatable idler units may be provided, including a translatable low speed idler 50 and a translatable high speed idler 40 which contact the inner surface of the elastic belt 6. The idlers 50, 40 can move up and down as shown in FIG. 4 in a same direction so that the length of belt 6 on one side is increased while the length of belt 6 on the other side is shortened. The phase of the signature transfer times thus may be altered. In order to assure proper synchronization, the translatable high speed idler 40 and translatable low speed idler 50 have a plurality of second notches 36 disposed along the rim of the translatable high speed idler 40 and translatable low speed idler 50. Each of the second notches 36 is shaped to accept the timing lobes 32.

The translatable low speed idler 50 and translatable high speed idler 40 can include, but are not limited to, pulleys or rolls.

FIG. 5 shows a top view of a power transmission device 501, which includes the drive unit 4. The power transmission device 501 includes a driven gear 500 which can be connected to a motor or a drive gear. The device also includes a register mechanism 502, which can be for example a clutch to change the movement or phasing of the drive unit 4 with respect to the drive unit 2.

A control unit 504 can control the register mechanism 502 and the translation of idler units 40, 50, and may synchronize the drive unit 4 so that a proper phasing between the first drive unit 2, second drive unit 4, and each of the translatable idler units 40, 50 is maintained. The control unit may include, for example, a microprocessor commercially available from INTEL.

Rather than having notches in the drive unit pulleys, no slip rollers could also been provided to interact with the inner surface of the belt.

"Sheet product" as defined herein includes signatures, sheet assemblies, and single sheets, all either printed or unprinted and being made of paper or other material.

"Gripper" as defined herein includes any device for retaining, holding or grasping a sheet product.

An acceleration device could be provided by reversing the sheet direction and having the grippers at the low speed roller actuate to grasp products, the grippers releasing at the high speed roller.

What is claimed is:

1. A sheet product transfer device comprising:
   an elastic belt forming a continuous loop, the elastic belt having an inner surface;
   a first drive unit contacting the inner surface;
   a second drive unit spaced apart from the first drive unit and contacting the inner surface of the elastic belt, the second drive unit driving the elastic belt at a different surface speed than the first drive unit; and
   a plurality of sheet product grippers arranged on the elastic belt.

2. The sheet product transfer device as recited in claim 1 wherein the first and second drive units include pulleys.

3. The sheet product transfer device as recited in claim 1 wherein the first drive unit includes a pulley having a radius different from a second pulley of the second drive unit.

4. The sheet product transfer device as recited in claim 1 wherein the first drive unit includes a pulley having a radius the same as a second pulley of the second drive unit, the pulley rotating at a speed different from the second pulley.

5. The sheet product transfer device as recited in claim 1 further comprising a plurality of translatable idler drive units positioned so at to contact the inner surface of the elastic belt.

6. The sheet product transfer device as recited in claim 1 further comprising a register mechanism attached to each power transmission device for synchronizing each power transmission device.

7. The sheet product transfer device as recited in claim 1 wherein the device is a deceleration device.

8. The sheet product transfer device as recited in claim 1 wherein the device is an acceleration device.

9. The sheet product transfer device as recited in claim 1 wherein the first and second drive units each include pulleys having a plurality of notches disposed along an outer surface.

10. The sheet product transfer device as recited in claim 9 wherein the elastic belt further comprises a plurality of timing lobes disposed on the inner surface, the timing lobes shaped so as to fit into the notches.

11. A method for transferring sheet products comprising:
   gripping a sheet product with a gripper attached to an elastic belt;
   decelerating the sheet product, the decelerating step includes rotating the elastic belt about a first drive unit and a second drive unit, the second drive unit driving the elastic belt at a different surface speed from the first drive unit; and
   releasing the sheet product.

12. The method as recited in claim 11 further comprising stretching the elastic belt with movable idler rollers.

13. The method as recited in claim 11 wherein the belt is continuous.

* * * * *